United States Patent [19]

Mukaiyama et al.

[11] Patent Number: 4,737,526

[45] Date of Patent: Apr. 12, 1988

[54] EXPANDABLE FLUORINE-CONTAINED POLYMER COMPOSITIONS AND FOAMS OF FLUORINE-CONTAINED POLYMER OBTAINED FROM THE COMPOSITIONS

[75] Inventors: Shigemi Mukaiyama; Shoji Noro, both of Suzuka, Japan

[73] Assignee: Asahi Kasei Kogyo Kabushiki Kaisha, Osaka, Japan

[21] Appl. No.: 928,045

[22] Filed: Nov. 7, 1986

[30] Foreign Application Priority Data

Nov. 12, 1985 [JP] Japan ................... 60-253588
Apr. 24, 1986 [JP] Japan ................... 61-93268

[51] Int. Cl.$^4$ ............................................. C08F 14/00
[52] U.S. Cl. ............................ 521/145; 521/98; 521/140; 521/149; 521/915
[58] Field of Search ............... 521/145, 98, 140, 149, 521/915

[56] References Cited

U.S. PATENT DOCUMENTS

| 3,072,582 | 1/1963 | Randa ................... 521/148 |
| 3,868,327 | 2/1975 | Gros ..................... 521/95 |
| 3,868,337 | 2/1975 | Gros ..................... 521/95 |
| 3,983,080 | 9/1976 | Suh ...................... 521/79 |
| 4,331,619 | 5/1982 | Chung et al. ........... 521/79 |
| 4,425,443 | 1/1984 | Georlette et al. ....... 521/97 |
| 4,615,850 | 10/1986 | Pecsok ................. 521/79 |

FOREIGN PATENT DOCUMENTS

| 424974 | 3/1967 | Japan . |
| 52-25860 | 2/1977 | Japan . |
| 57-89932 | 6/1982 | Japan . |
| 57-177081 | 10/1982 | Japan . |

OTHER PUBLICATIONS

*Rubber World*, Nov., 1984, pp. 36–37, 56.

Primary Examiner—Morton Foelak
Attorney, Agent, or Firm—Birch, Stewart, Kolasch & Birch

[57] ABSTRACT

An expandable fluorine-contained polymer composition comprising (A) a fluorine-contained polymer in which the ratio (tan δ) of dynamic loss modulus to dynamic storage modulus at a temperature 30° C. higher than the melting point of the polymer ranges from 0.3 to 0.9, and (B) a blowing agent, and a foam obtained from said composition.

11 Claims, No Drawings

EXPANDABLE FLUORINE-CONTAINED POLYMER COMPOSITIONS AND FOAMS OF FLUORINE-CONTAINED POLYMER OBTAINED FROM THE COMPOSITIONS

FIELD OF THE INVENTION AND RELATED ART STATEMENT

1. Field of the Invention

This invention relates to an expandable fluorine-containing polymer composition and a foam of a fluorine-containing polymer obtained therefrom. More particularly, this invention relates to a foam of a fluorine-containing polymer which has small compression set, good cushoning properties and elasticity, excellent chemical resistance, solvent resistance, creep resistance, radiofrequency insulating properties such as wire insulation and cable jacketing and surface smoothness, as well as excellent thermal insulating properties, weatherability and non-adhesive properties, and is useful as a sealing material as a transport container for chemicals and solvents; a gasket for piping and machinery and tools; a thermal insulating material, sealing material, waterproof material and roof thermal insulating waterproof material for buildings; a thermal insulating material for machinery and tools; a thermal insulating material for fireman's dress; a cushioning material for printing plates; a material for transfer rolls for printing machines and copy machines; an insulating material for high-speed data communications such as computers and communication circuits; abrasive cloth for precision polishing required to have uniform dispersion of fine abrasive particles; a cushioning material required to have high chemical resistance; etc. This invention relates also to an expandable fluorine-containing polymer composition which can give said foam.

2. Background Art

As fluorine-containing polymer foams, there have heretofore been known, for example, a porous body having a porosity of about 60% obtained by sintering fine particles of polytetrafluoroethylene (Japanese Patent Publication No. 4974/67), and a foam obtained by expanding a tetrafluoroethylene-perfluoro-α-olefin copolymer by using fluoromethane (U.S. Pat. No. 3,072,583). However, with the former, the porous body is obtained as an open-cell foam because of its production process and hence cannot have stable electrical insulating properties, so that it is insufficient in quality. The latter, the foam generally has a large cell diameter of 200 to 300 μm and an expansion ratio in the range of 1.7 to 2.5-fold, and is disadvantageous in that it is poor in electrical insulating properties (dielectric strength) and thermal insulating properties.

On the other hand, there has also been developed a foam having a porosity of 5 to 70% and a cell diameter of 100 μm or less made of thermoplastic fluorine-containing resin (Japanese Patent Publication Kokai (Laid-Open) No. 177081/82). However, this foam has neither electrical insulating properties nor thermal insulating properties which are sufficient for practical use.

Furthermore, all of these foams are disadvantageous in that they are poor in elasticity, tensile strength, tear propagation strength, compression set and the like because thermoplastic fluorine-containing resin are used in them.

There is also known a foam obtained by mixing a low-viscosity, fluorine-containing elastomer with a vulcanizing agent and a blowing agent, and heating the resulting mixture under pressure (U.S. Pat. No. 3,868,337). However, this foam has too large a cell size, and it is too soft because its base is the elastomer, so that it can be used only for limited purposes.

DISCLOSURE OF INVENTION

An object of this invention is to provide a crystalline fluorine-containing polymer composition capable of giving a foam which is free from the above-mentioned defects of the conventional foams of fluorine-containing polymer and have excellent characteristics, for example, excellent elasticity, tensile strength, tear propagation strength, compression set and the like and good thermal insulating properties, electrical insulating properties, cushioning properties and surface smoothness.

Another object of this invention is to provide a foam having the above-mentioned excellent characteristics obtained from the crystalline fluorine-contained polymer composition.

Many other objects and purposes of the invention will be clear from the following detailed description of the specification.

The present inventors have devoted themselves to research and have consequently found that the objects described above can be achieved by using, as fluorine-containing polymer as a base, a crystalline fluorine-containing polymer in which the ratio (tan δ) of dynamic loss modulus to dynamic storage modulus at a temperature 30° C. higher than the melting point of said polymer ranges from 0.3 to 0.9, preferably from 0.35 to 0.8. On the basis of this finding, this invention has been accomplished.

In other words, the present inventors have accomplished this invention on the basis of the finding that a foam capable of achieving the above-mentioned objects can be obtained by expanding an expandable fluorine-containing polymer composition comprising a crystalline fluorine-containing polymer having a tan δ of 0.3 to 0.9 and a blowing agent.

BEST MODE FOR CARRYING OUT THE INVENTION

The crystalline fluorine-containing polymer used in this invention includes, for example, those having a ratio (tan δ) of a dynamic loss modulus to dynamic storage modulus at a temperature 30° C. higher than the melting point of said polymer of 0.3 to 0.9, preferably 0.35 to 0.8 and obtained by using as main component at least one monomer selected from the group consisting of fluoroethylenes such as monofluoroethylene, 1,1-difluoroethylene, 1,1,2-trifluoroethylene, monochlorotrifluoroethylene, tetrafluoroethylene and the like; fluoro-α-olefins such as pentafluoropropylene, hexafluoropropylene, perfluoropentene-1 and the like; fluoroalkyl fluorovinyl ethers such as trifluoromethyl perfluorovinyl ether, perfluoroethyl perfluorovinyl ether, perfluoropropyl perfluorovinyl ether and the like; and fluoroalkyl vinyl ethers such as trifluoromethyl vinyl ether, perfluoroethyl vinyl ether, perfluoropropyl vinyl ether and the like. Said crystalline fluorine-containing polymer may, if desired, contain copolymerizable monomers for example, olefins such as ethylene, propylene, butene and the like, alkyl vinyl ethers, acrylic acid esters, methacrylic acid esters, etc. in an amount in the range where favorable characteristics of the polymer are not greatly deteriorated.

Crystalline fluorine-containing polymers subjected to crosslinking treatment are also used as the base polymer. Among such fluorine-containing polymers, fluorine-containing polymers having hydrogen atoms in the molecular chain are especially advantageous because they are easily crosslinked by irradiation with ionizing radiation or by a chemical crosslinking agent into a fluorine-containing polymer having a uniform crosslinked structure to form a foam of high expansion.

The crosslinking treatment is carried out by adding, to the fluorine-containing polymer, a chemical crosslinking agent, for example, a monoperoxy compound, e.g., a diacyl peroxide such as dibenzoyl peroxide or the like, dicumyl peroxide, di-t-butyl peroxide, or a peroxy ester such as t-butyl peroxy acetate, t-butyl peroxy isopropylcarbonate, t-butylperoxy benzoate or the like, or a diperoxy compound, e.g., 2,5-dimethyl-2,5-di-(t-butylperoxy)-hexyne-3, 2,5-dimethyl-2,5-(t-butylperoxy)-hexane, $\alpha,\alpha'$-bis-(t-butylperoxy)-p-diisopropylbenzene or 2,5-dimethyl-2,5-di-(benzoylperoxy)-hexane, and heating the resulting mixture; by irradiating the fluorine-containing polymer with an ionizing radiation such as $\alpha$-rays, $\beta$-rays, $\gamma$-rays, neutron rays, accelerated particle beam, electron beam or the like in air, in a vacuum, in an inert gas such as argon, helium, nitrogen or the like, or in water; or by mixing a crystalline, crosslinkable, fluorine-containing polymer containing a copolymerizable monomer having a crosslinkable functional group such as $-SO_2F$, $-COF$, $-COOH$, $-COOR$, $-CN$ or the like in an amount of 0.1 to 55% by weight, preferably 1 to 10% by weight with a low-molecular-weight compound capable of reacting with the aforesaid functional group to form a crosslinkage, and heating the resulting mixture. It is also possible to crosslink the fluorine-containing polymer by, if necessary, adding a crosslinking assistant such as an allyl compound, sulfur, organic amine, methacrylate, acrylate, divinyl compound, oxime compound or the like.

The degree of crosslinking of the crystalline fluorine-contained polymer thus subjected to crosslinking treatment is properly selected depending on the desired performance characteristics of the resulting foam, expansion ratio, kind of polymer and like, and can be determined by measuring the dynamic viscoelasticity of the polymer. In this invention, there is selectively used a crystalline fluorine-containing polymer crosslinked so as to adjust the ratio (tan $\delta$) of dynamic loss modulus to dynamic storage modulus at a temperature 30° C. higher than the melting point of the polymer to 0.3 to 0.9, preferably 0.35 to 0.8.

Although as described above, various methods can be employed for the crosslinking treatment, the method of crosslinking by irradiation with ionizing radiation is especially preferred, for example, because it permits uniform crosslinking and can give a sheet having a uniform thickness even in the case of a wide sheet.

A technique of crosslinking and expansion by irradiation with ionizing radiation is known for polyolefins, but when this conventional technique is applied as it is to crystalline, fluorine-containing polymers, some crystalline fluorine-containing polymers cannot be crosslinked and are seriously decomposed and some other crystalline fluorine-containing polymer can be crosslinked but cannot be expanded. Although the reason why they are crosslinkable but unexpandable is not apparent, it seems to be a cold flow property which is characteristic of fluorine-containing polymers.

Therefore, in expanding a fluorine-containing polymer, it is important to select the kind of polymer, copolymer composition, polymerization conditions, degree of polymerization, etc. and carry out crosslinking so as to attain a degree of crosslinking suitable for the fluorine-containing polymer. In the case of industrial production, the viscoelasticity of the polymer should be grasped more precisely in order to control the quality of the foam. However, a method comprising measuring the gel fraction and a method comprising measuring the modulus of elasticity which are well known for polyolefins cannot be applied to fluorine-containing polymers for the following reasons. Measurement of gel fraction is impossible because there is no solvent dissolving the fluorine-contained polymer. In the case of the method comprising measuring the modulus of elasticity, decomposition of the fluorine-contained polymer occurs simultaneously with crosslinking of the polymer, and the modulus of elasticity cannot be used alone as a measure of crosslinking because of the cold flow characteristic of fluorine-contained polymers.

Therefore, the present inventors have conducted energetic research and have consequently found that expansion of a fluorine-containing polymer and production of a high-quality foam can be made possible by measuring the dynamic storage modulus and the dynamic loss modulus at a temperature 30° C. higher than the melting point and selecting the ratio of the latter to the former (tan $\delta$), whereby this invention has been accomplished.

The value of tan $\delta$ in this invention ranges from 0.3 to 0.9, preferably from 0.35 to 0.8. Fluorine-containing polymers have a tan $\delta$ of more than 0.9 are not preferable because the cellular structure of the resulting foam becomes nonuniform, resulting in formation of large voids, roughness of the surface and pinholes in cell walls. On the other hand, fluorine-containing polymers having a tan $\delta$ of less than 0.3 are not preferable because the expansion ratio is very small, so that no high-quality foam rich in elasticity can be obtained. In particular, fluorine-containing polymers having a tan $\delta$ of 0.35 to 0.80 are suitable because they can give a foam which has a high expansion ratio, a high closed-cell percentage, a high elasticity and excellent cushioning properties.

Concrete examples of the crystalline fluorine-containing polymer used in this invention include crystalline fluorine-containing polymers having a ratio (tan $\delta$) of dynamic loss modulus to dynamic storage modulus at a temperature 30° C. higher than its melting point of 0.3 to 0.9, preferably from 0.35 to 0.8 which are selected from fluorine-containing polymers having hydrogen atoms in the molecular chain such as polyvinyl fluorides, polyvinylidene fluorides, ethylene-tetrafluoroethylene copolymers, propylene-tetrafluoroethylene copolymers, vinylidene fluoride-tetrafluoroethylene copolymers, vinylidene fluoride-pentafluoropropylene copolymers, vinylidene fluoride-hexafluoropropylene copolymers, vinylidene fluoride-hexafluoropropylene-tetrafluoroethylene copolymers, vinylydine fluoride-perfluoroalkyl perfluorovinyl ether copolymers, tetrafluoroethylene-perfluoroalkyl vinyl ether copolymers, ethylene-chlorotrifluoroethylene copolymers, tetrafluoroethylene-perfluoroalkyl vinyl ether-vinylidene fluoride copolymers, etc.; crystalline fluorine-contained polymers having a ratio (tan $\delta$) of dynamic loss modulus to dynamic storage modulus at a temperature 30° C. higher than the melting point of the base polymer which are obtained by crosslinking the above-mentioned polymers by the crosslinking method described above of 0.3 to 0.9, preferably 0.35 to 0.8; and crystalline fluorine-containing polymers having a ratio (tan δ) of dynamic loss modulus to dynamic storage modulus at a temperature 30° C. higher than the melting point of 0.3 to 0.9, preferably 0.35 to 0.8 which are obtained by subjecting to addition reaction fluorine-containing polymers having a crosslinkable functional group selected from the group consisting of tetrafluoroethylene-perfluoroalkyl perfluorovinyl ether-(2-cyanotetrafluoroethyloxy)perfluoropropyl perfluorovinyl ether copolymers, tetrafluoroethylene-perfluoroalkyl perfluorovinyl ether-2-cyanoperfluoroethyl perfluorovinyl ether copolymers, tetrafluoroethylene-perfluoroalkyl perfluorovinyl ether-3-chlorosulfonyl perfluoropropyl perfluorovinyl ether copolymers, etc., or by reacting them with a crosslinking assistant such as allyl compound, sulfur, organic amine, methacrylate compound, acrylate compound, divinyl compound, oxime compound or the like.

Particularly preferable crystalline fluorine-containing polymers include ethylene-tetrafluoroethylene copolymers, polyvinylidene fluorides, vinylidene fluoride-hexafluoropropylene copolymers, vinylidene fluoride-tetrafluoroethylene copolymers, vinylidene fluoride-hexafluoropropylene-tetrafluoroethylene copolymers, etc.

Unlike non-crystalline fluorine-containing elastomers, the crystalline fluorine-containing polymer of this invention is a crystalline polymer having an endothermic peak in DTA measurement. If desired, said fluorine-containing polymer can be incorporated with, for example, fluorine-containing elastomers, fluorine-containing waxes, etc. in an amount in the range where its physical properties are not deteriorated. In this case, their adding amount is usually selected in the range of 0.1 to 50% by weight.

As the blowing agent used in this invention, there are suitably used volatile physical blowing agents, in particular, volatile physical blowing agents having a solubility in the fluorine-contained polymer of 0.02 mol or more per kg of the polymer and a rate of the blowing agent loss from the fluorine-contained polymer at 25° C. of less than 20% of the add-on per 0.1 day in a sheet having a thickness of 1.2 mm. Volatile physical blowing agents having solubility in the polymer of less than 0.02 mol per kg of the polymer are not preferable because the resulting foam has an expansion ratio of 1.5-fold or more with difficulty, and tends to have portions of uneven expansion ratio. Volatile physical blowing agents having a rate of the blowing agent loss of 20% or more per 0.1 day in a sheet having a thickness of 1.2 mm is not preferable either because the resulting foam has a low expansion ratio, has ununiformity of cell size distribution, and tends to have larger voids.

Suitable volatile physical blowing agents are properly selected from conventional ones depending on the properties of the fluorine-containing polymer used, and there are usually used, for example, hydrocarbons such as propane, butane, pentane and the like; chlorinated hydrocarbons such as chloroform, methyl chloride, methylene chloride, carbon tetrachloride and the like; and fluorochlorinated hydrocarbons such as dichlorodifluoromethane, dichlorofluoromethane, trichloromonofluoromethane, trichlorotrifluoroethane, tetrachlorodifluoroethane and the like. These compounds may be used alone, or in combination, or as a mixture with other volatile organic compounds which contains at least 50 mole % of them.

Among these physical blowing agents, those having a solubility in said polymer of 0.04 mol or more per kg of the polymer and a rate of the blowing agent loss from the polymer at 25° C. of 10% or less of the add-on per 0.1 day in a sheet having a thickness of 1.2 mm are particularly preferred because they give a foam excellent in elasticity having an expansion ratio of 3-fold or more.

Factors which determine an adequate add-on of physical blowing agent with which the polymer is impregnated include ① the expansion ratio, ② the solubility of the blowing agent in said polymer, ③ the rate of loss of the blowing agent from said polymer, ④ the storage period from impregnation to expansion, etc., though the main factor is the expansion ratio of a foam to be obtained and the adequate add-on is properly determined depending on the value of the expansion ratio. In this case, the factors ② to ④ are also taken into consideration, and an add-on of 0.05 to 3.0 mols per kg of said polymer is generally selected.

The expandable fluorine-containing polymer composition of this invention can be produced, for example, by a process comprising melting and kneading a chemical blowing agent and a crystalline fluorine-containing polymer at a temperature higher than the melting point of the fluorine-containing polymer and lower than the decomposition temperature of the blowing agent; a process comprising forming the composition obtained by the melting and kneading into a sheet, a rod or a thread, and then crosslinking the same by irradiation with electron beam or ionizing radiation, or the like; a process comprising melting and kneading a physical blowing agent and a crystalline fluorine-containing polymer under pressure, and cooling the resulting mixture to a temperature at which expansion is depressed; a process comprising heating a physical blowing agent and a crystalline fluorine-containing polymer in an autoclave under pressure to impregnate the polymer with the blowing agent in vapor or liquid of the blowing agent; a process comprising crosslinking the above-mentioned physical blowing agent-containing composition by irradiation with electron beam or ionizing radiation, or the like; or a process comprising crosslinking a crystalline fluorine containing polymer by irradiation with electron beam or ionizing radiation, or the like, and heating the crosslinked fluorine-containing polymer and a physical blowing agent in an autoclave under pressure to impregnate the former with the latter.

The foam of crystalline fluorine-containing polymer of this invention can be produced by preparing an expandable composition by any of the above-mentioned processes, and then expanding the same by heating.

This expansion by heating is conducted usually by heating the expandable composition to a temperature in the range from a temperature 50° C. lower than the melting point of the fluorine-containing polymer to a temperature 55° C. higher than said melting point. At a temperature lower than the melting point by more than 50° C., no expansion ratio of 1.5-fold or more can be attained. At a temperature higher than the melting point by more than 55° C., shrinkage of the foam is serious, so that no foam of good quality can be obtained. The reason why the upper limit of the expanding temperature is 55° C. higher than the melting point of the fluorine-containing polymer is not completely apparent, but it thought to be as follows. At high temperatures, fluorine-containing polymers undergo serious deformation due to the slip phenomenon between molecular chains characteristic thereof and fall into a fluid state where their behaviors are different from the viscoelastic behavior of conventional polymeric compounds due to entanglement of molecular chains. Therefore, at a temperature higher than a certain temperature, inflation and deformation of cell walls proceed owing to a low internal pressure in cells, so that no stabilization of cells occurs, resulting in shrinkage or destruction of the cells.

The fluorine-containing polymer foam of this invention is required to have an expansion ratio of at least 1.5-fold or more. A fluorine-containing polymer foam having an expansion ratio of less than 1.5-fold is poor in the elasticity characteristic of foams and hence is disadvantageous, for example, in that it cannot have good sealing properties as a sealing material, and is poor in thermal insulating properties as a thermal insulation material, in elasticity as an industrial material for elastic rolls, in surface properties as polishing pads, and in shock-absorbing ability as a cushioning material. Therefore, such a fluorine-containing polymer foam is not preferable.

A foam having an expansion ratio of 3-fold or more is preferred because it is excellent in elasticity as well as in mechanical strengths such as tensile strength, tear propagation strength and the like, have a small compression set, can exhibit sealing ability even at a low clamp stress, and is excellent also in thermal insulating properties, elasticity, surface properties and shock-absorbing properties. In particular, a foam having an expansion ratio of 10-fold or more is excellent in elasticity and is more suitable as a cushioning material or a thermal insulating material. As the foam of this invention, one which has a high expansion ratio can be produced depending on purposes by properly selecting the kind of fluorine-containing polymer used, crosslinking method, degree of crosslinking expansion method, and the like, though one which has an expansion ratio of 50-fold or less is generally preferred from the viewpoint of mechanical strength.

The foam of this invention is preferably one which has uniform cells and contains no larger void having a diameter more than 10 times as large as the average cell diameter. When it contains a void having a diameter more than 10 times as large as the average cell diameter, it becomes a foam which is poor in recovery after compression, has no elasticity, has low mechanical strengths such as tensile strength and tear propagation strength, and hence causes insufficient sealing or fracture due to clamping when used as a sealing material. Such a foam is not preferable because it causes water leakage due to break when used as a waterproof material.

When the foam of this invention has an average cell diameter of 90 μm or less, it is more excellent in surface properties, sealing properties, insulation properties and thermal insulating properties as a material for transfer roll, polishing pads, a sealing material, an insulating material for high-speed data communications or a thermal insulating material.

The foam of this invention is formed, depending on purposes, into a sheet, a film, a thread, a cylinder, a tube, a rod or the like, or into an optional shape by punching, cutting, adhesion or the like.

The foam of this invention may contain pigments, fillers, reinforcing materials and the like, and may have a cellular structure and an expansion ratio which are uniform or lamellarly uneven in the thickness direction.

EXAMPLES

This invention is further explained below in more detail with reference to the Examples.

Measured values were obtained in the following manner.

(1) Melt flow rate of fluorine-containing polymer

Measured by means of the apparatus described in ASTM D2116-75 under the conditions described in ASTM D1238 (for polyvinylidene fluoride) or under the conditions described in ASTM D3159 (for ethylene-tetrafluoroethylene copolymer, etc.).

(2) Melting point of fluorine-containing polymer and temperature at the beginning of melting The melting point was measured by the method of DTA described in ASTM D3159-73, and the temperature at the beginning of melting was defined as a temperature at the beginning point of rising of melting peak determined by the base line method.

(3) Expansion ratio

Measured from the densities of foam and polymer calculated from the weight of a sample and its volume measured by immersion in water, by using the equation:

$$\text{Expansion ratio} = \frac{\text{Density of polymer (g/cm}^3\text{)}}{\text{Density of foam (g/cm}^3\text{)}}$$

(4) Rate of blowing agent loss

The rate of blowing agent loss is a value determined by taking out an expandable composition 25 mm square having a thickness of 1.2 mm from an autoclave, then exposing it in the atmosphere at 25° C., and dividing the amount (parts by weight) of blowing agent which lost in 0.1 day (144 minutes) from 1 minute after taking off, by the amount (parts by weight) of blowing agent contained in the composition 1 minutes after the taking-off. The rate of blowing agent loss was calculated by using the equation:

$$\text{Rate of blowing agent loss (\%)} = \frac{\begin{array}{c}\text{Blowing agent content} \\ \text{(parts by weight)} \\ \text{1 minute after the} \\ \text{taking-out}\end{array} - \begin{array}{c}\text{Blowing agent content} \\ \text{(parts by weight)} \\ \text{0.1 day after the} \\ \text{taking-out}\end{array}}{\begin{array}{c}\text{Blowing agent content} \\ \text{(parts by weight)} \\ \text{1 minute after the} \\ \text{taking-out}\end{array}} \times 100$$

(5) Solubility of blowing agent in fluorine-containing polymer

Calculated from increased weight of a sheet-like sample measured by immersing the sheet-like sample having a thickness of about 0.2 mm in a blowing agent at 75° C., and allowing the same to stand for 4 days.

(6) tan δ

According to the method described in FIG. 4a among the methods described in Rubber World December 1983, p. 15–23, dynamic loss modulus (G″) and dynamic storage modulus (G′) were measured in a nitrogen gas atmosphere at a temeprature 30° C. higher than the melting point of polymer under the conditions of an angular frequency of 10 radian/sec and a strain percentage of 5% by means of a Dynamic Spectrometer Model RDS-7700 mfd. by Rheometrics Inc., and the ratio between them, (tan $\delta = G''/G'$) was calculated.

For the measurement, a parallel-plate mode was employed, and discoidal samples having a thickness of 1.2 mm and a diameter of 2.5 mm were used.

(7) Hardness

Measured by means of the A-type hardness tester described in JIS K6301.

(8) Closed cell percentage

Calculated as the balance with respect to open cell percentage determined by the air pycnometer method described in ASTM-D2856.

(9) Average cell diameter

A section in the thickness direction of a sample was enlarged 25-fold or observed by means of an electron microscope, and the major diameters and the minor diameters of 20 or more cells selected at random were measured. The average cell diameter was shown in terms of the average of the major and minor diameters.

(10) Leakage (sealing properties)

A pressure vessel with a capacity of 100 ml having a cap with an inside diameter of 18 mm was used. A sample having an outside diameter substantially equal to the inside diameter of the cap and a thickness of 2 to 3 mm was inserted into the cap, and 10 ml of dichlorodifluoromethane was placed therein. The vessel was tightly closed and the allowed to stand in a thermostat at 25° C. for 24 hours, and its weight was measured with the lapse of time. The change of the weight per hour was calculated, and the gas leakage (cc per hour) was calculated, taking the specific volume of dichlorodifluoromethane gas as 26.85 cm$^3$/g.

(11) Maximum airtightness pressure (sealing properties)

A pressurizing apparatus having a cap with a inside diameter of 18 mm at the tip of its pressure conduit was used. A sample having an outside diameter substantially equal to the inside diameter of the cap and a thickness of 2 to 3 mm was inserted into the cap and the cap was tightened by hand. The cap portion was submerged in water and nitrogen gas pressure was gradually applied by means of the pressurizing apparatus. There was measured a nitrogen gas pressure at which air bubbles appeared from the cap portion at a rate of one bubble per second.

(12) Recovery after compression

A 50% compressive strain was given to a test piece by the compressive test method described in JIS K6301, and the thickness of the test piece 10 minutes after removing the load was measured. The recovery after compression was calculated by using the equation:

$$\text{Recovery after compression (\%)} = \frac{\text{Thickness (mm) of test piece after test}}{\text{Original thickness (mm) of test piece}} \times 100$$

(13) Tensile strength

Measured by the method described in JIS K6301.

(14) Surface smoothness

A foam sheet was cut by using laser, after which the cut surface was enlarged 50-fold and a section of the sheet surface selected at random was observed. The maximum distance between a tangent to the surface and the bottom of an indent in the foam surface was measured. The rating (mark) of surface smoothness shown in the Tables was as follows:

O: 10 μm or less
Δ: more than 10 μm and less than 50 μm
X: more than 50 μm

(15) Surface thermal resistance

A foam sheet was cut into a size of 200 mm square, and a thermocouple was attached to each surface of the resulting piece. The quantity of heat $Q_a$ (Kcal/h) transferred by the sample, the air temperature on the high temperature side ($\theta_H$) and the sample surface temperature on the high temperature side ($\theta_{HS}$) were measured by a method according to ASTM C236, and the surface thermal resistance was calculated by using the equation:

$$\text{Surface thermal resistance (m}^2 \cdot h \cdot °C./\text{Kcal)} = \frac{(\theta_H - \theta_{HS}) \times 0.04}{Q_a}$$

(16) Dielectric strength ratio

The dielectric strength of a foam was measured by raising the voltage at a rate of 1 KV/sec, by a method according to ASTM D149, and the ratio of the dielectric strength of the foam to that of base polymer was calculated by using the equation:

$$\text{Dielectric strength ratio (\%)} = \frac{\text{Dielectric strength of foam } (KV/\text{mm})}{\text{Dielectric strength of base polymer } (KV/\text{mm})} \times 100$$

EXAMPLE 1

Ethylene-tetrafluoroethylene copolymer [AFLON COP C55A, mfd. by Asahi Glass Co., Ltd., density 1.73 g/cm$^3$, melt flow rate (297° C., 2.16 kg) 1.0–1.8 g/10 min, melting point 268° C.] was formed into a sheet of 1.2 mm in thickness by means of a hot press, and the sheet was irradiated in air at room temperature at a dose of 35 Mrad by electron beam to be crosslinked. Two faces of the sheet were irradiated so as to absorb the beam uniformly in the direction of the thickness of the sheet. The tan δ at 298° C. of the crosslinked sheet was 0.37.

The crosslinked sheet was placed in an autoclave together with trichlorotrifluoroethane and allowed to stand at 75° C. for 4 days to be impregnated with trichlorotrifluoroethane, whereby there was obtained an expandable composition containing trichlorotrifluoroethane in an amount of about 7.0 parts by weight (0.37 mol/kg) per 100 parts by weight of the polymer.

The expandable composition was heated on an oil bath at 300° C. for 20 seconds to obtain a foam excellent in flexibility which had an expansion ratio of about 4.5-fold and contained uniform cells having an average cell diameter of 0.2 mm.

EXAMPLE 2

Polyvinylidene fluoride [KYNAR 720, mfd. by Pennwalt Corp., density 1.75 g/cm$^3$, melt flow rate (230° C., 2.16 kg) 4 g/10 min., melting point 169° C.] was formed into a sheet of 1.2 mm in thickness by means of a hot press, and the sheet was irradiated by electron beam of 20 Mrad to be crosslinked in the same manner as in Example 1. The tan δ at 199° C. of the crosslinked sheet was 0.88.

The crosslinked sheet was impregnated with dichloromonofluoromethane in the same manner as in Example 1 to obtain an expandable composition containing dichloromonofluoromethane in an amount of about 6.7 parts by weight (0.65 mol/kg) per 100 parts by weight of the polymer.

The expandable composition was heated on an oil bath at 220° C. for 25 seconds to obtain a foam excellent in flexibility which had an expansion ratio of about 3.0-fold and contained uniform cells.

EXAMPLE 3

Ethylene-chlorotrifluoroethylene copolymer (HALAR 901, mfd. by Allied Corp., density 1.68 g/cm$^3$, melting point 241° C.) was formed into a sheet of 1.2 mm in thickness by means of a hot press, and the sheet was irradiated by electron beam of 20 Mrad to be crosslinked in the same manner as in Example 1. The tan δ at 271° C. of the crosslinked sheet was 0.85.

The crosslinked sheet was impregnated with trichlorotrifluoroethane in the same manner as in Example 1 to obtain an expandable composition containing trichlorotrifluoroethane in an amount of about 9.6 parts by weight (0.51 mol/kg) per 100 parts by weight of the polymer.

The expandable composition was heated on an oil bath at 280° C. for 25 seconds to obtain a foam excellent in flexibility which had an expansion ratio of about 3.0-fold and contained uniform cells.

EXAMPLE 4

A crosslinked sheet was prepared in the same manner as in Example 2, except that the irradiation dose was changed to 30 Mrad. The tan δ at 199° C. of the crosslinked sheet was 0.76. Subsequently, an expandable composition was obtained in the same manner as in Example 2, except for using this crosslinked sheet, and then heated on an oil bath at 220° C. for 25 seconds to obtain a foam excellent in flexibility which had an expansion ratio of about 10.0-fold and contained uniform cells having an average cell diameter of about 0.15 mm.

EXAMPLES 5 TO 8, AND COMPARATIVE EXAMPLES 1 TO 3

Expandable compositions were prepared in the same manner as in Example 1, except that the fluorine-containing polymer and the irradiation dose were changed as shown in Table 1. Subsequently, each expandable composition was heated on an oil bath at 300° C. for 20 seconds to obtain a foam. Properties of the foams thus obtained are tabulated in Table 1 together with the results of Examples 1 to 4.

From Table 1, it is evident that the foams of this invention are excellent in recovery after compression and rich in elasticity, and are high-quality foams excellent in tensile strength because they have no unevenness in the surface and have such a uniform cellular structure that they have in the interior no large void having a diameter 10 times as large as the average cell diameter. It is also evident that foams of polymers having a low degree of crosslinking and a large value of tan δ and foams of uncrosslinked polymers are poor in elasticity and tensile strength because they have surface roughness and have such an ununiform cellular structure that they have large voids and break of cell walls in the interior. Further, foams of polymers having a high degree of crosslinking and a small value of tan δ had a very low expansion ratio, low elasticity, an ununiform cellular structure, and surface roughness, and were thus foams of low commercial value.

TABLE 1

| | Properties of polymer | | | | Properties of foam | | | |
|---|---|---|---|---|---|---|---|---|
| | Fluorine-contained polymer (melting point °C.) | Dose | tan δ (measurement temp °C.) | Blowing agent | Expansion ratio (fold) | Recovery after compression (%) | Tensile strength (kg/cm$^2$) | Remarks |
| Example | | | | | | | | |
| 2 | Polyvinylidene fluoride KYNAR 720, mfd. by Pennwalt Corp. (169) | 20 | 0.88 (199) | Dichloromonofluoromethane | 3.0 | 60 | 150 | Uniform cells |
| 3 | Ethylele-chlorotrifluoroethylene copolymer HALAR 901, mfd. by Allied Corp. (241) | 20 | 0.85 (271) | Trichlorotrifluoroethane | 3.0 | 60 | 130 | Uniform cells |
| 4 | Polyvinylidene fluoride KYNAR 720, mfd. by Pennwalt Corp. (169) | 30 | 0.76 (199) | Dichloromonofluoromethane | 10.0 | 73 | 26 | Uniform cells |
| 5 | Ethylene-tetrafluoroethylene copolymer AFLON COPC-88A, mfd. by Asahi Glass Co., Ltd. (267) | 35 | 0.45 (297) | Trichlorotrifluoroethane | 5.5 | 72 | 47 | Uniform cells |
| 6 | Ethylene-tetrafluoroethylene copolymer AFLON COPC-88APM, mfd. by Asahi Glass Co., Ltd. (266) | 40 | 0.38 (296) | Trichlorotrifluoroethane | 6.0 | 73 | 45 | Uniform cells |
| 1 | Ethylene-tetrafluoroethylene copolymer AFLON COPC-55A, mfd. by Asahi Glass Co., Ltd. (268) | 35 | 0.37 (298) | Trichlorotrifluoroethane | 4.5 | 70 | 59 | Uniform cells |
| 7 | Ethylene-tetrafluoroethylene copolymer AFLON COPC-55A, mfd by Asahi Glass Co., Ltd. (268) | 50 | 0.31 (298) | Trichlorotrifluoroethane | 3.5 | 65 | 105 | Uniform cells |
| 8 | Ethylene-tetrafluoroethylene copolymer AFLON COPC-55A, mfd by Asahi Glass Co., Ltd. (268) | 35 | 0.37 (298) | Pentane | 1.6 | 50 | 230 | Uniform cells |
| 1 | Ethylene-tetrafluoroethylene copolymer AFLON COPC-55A, mfd. by Asahi Glass Co., Ltd. (268) | 0 | 1.20 (298) | Trichlorotrifluoroethane | 1.8 | 20 | 150 | Ununiform cells |

TABLE 1-continued

| | Properties of polymer | | | | Properties of foam | | | |
|---|---|---|---|---|---|---|---|---|
| | Fluorine-contained polymer (melting point °C.) | Dose | tan δ (measurement temp °C.) | Blowing agent | Expansion ratio (fold) | Recovery after compression (%) | Tensile strength (kg/cm$^2$) | Remarks |
| Comparative Example | | | | | | | | |
| 2 | Ethylene-tetrafluoroethylene copolymer AFLON COPC-88A, mfd. by Asahi Glass Co., Ltd. (267) | 5 | 1.10 (297) | Trichlorotrifluoroethane | 1.8 | 30 | 150 | Ununiform cells |
| 3 | Ethylene-tetrafluoroethylene copolymer AFLON COPC-55A, mfd. by Asahi Glass Co., Ltd. (268) | 70 | 0.25 (298) | Trichlorotrifluoroethane | 1.3 | 20 | 200 | Ununiform cells and surface roughness |

EXAMPLES 9 TO 14

Foams were obtained in the same manner as in Example 1, except that each of the blowing agent listed in Table 2 was used in place of that used in Example 1. Properties of the foams are tabulated in Table 2.

EXAMPLES 15 TO 18

Foams were obtained in the same manner as in Example 4, except that each of the blowing agents listed in Table 2 was used in place of that used in Example 4. Properties of the foams are tabulated in Table 2.

The foam of Example 18 had substantially uniform cells, though cells having a diameter 5 to 6 times as large as the average cell diameter were observed therein in places.

TABLE 2

| | Fluorine-contained polymer [Melting point] <tan δ> | Properties of blowing agent | | | Add-on of blowing agent (mol/kg) | Rate of blowing agent loss (%) | Properties of foam | | | |
|---|---|---|---|---|---|---|---|---|---|---|
| | | Kind | Critical temp. (°C.) | Melting point of polymer − Critical temp. (°C.) | | | Expansion ratio | Recovery after compression (%) | Tensile strength (kg/cm$^2$) | Remarks |
| Example | | | | | | | | | | |
| 9 | Ethylene-tetrafluoroethylene copolymer | Carbon tetrachloride | 283 | −15 | 0.35 | 2 | 4.5 | 70 | 60 | Uniform cells |
| 10 | (AFLON COPC-55A mfd. by Asahi Glass Co., Ltd.) | Tetrachlorodifluoroethane | 278 | −10 | 0.37 | 2 | 4.6 | 71 | 59 | |
| 11 | [M.P. 268° C.] <0.37> | Chloroform | 263 | +5 | 0.50 | 8 | 3.5 | 65 | 105 | |
| 1 | | Trichlorotrifluoroethane | 214 | +54 | 0.37 | 2 | 4.5 | 70 | 59 | |
| 12 | | Pentane | 197 | +71 | 0.17 | 2 | 3.0 | 64 | 110 | |
| 13 | | Trichlorotrifluoroethane and pentane (50/50 by weight) | — | — | 0.15 | 2 | 3.5 | 65 | 104 | |
| 14 | | Dichlorotetrafluoroethane | 146 | +122 | 0.39 | 6 | 1.6 | 52 | 232 | Small cells |
| 4 | Polyvinylidene fluoride (KYNAR 720 mfd. by Pennwalt Corp.) | Dichloromonofluoromethane | 179 | −10 | 0.65 | 7 | 10 | 73 | 26 | Uniform cells |
| 15 | [M.P. 169° C.] <0.76> | Dichlorodifluoromethane | 112 | +57 | 0.09 | 3 | 3.6 | 62 | 130 | |
| 16 | | Trichloromonofluoromethane | 198 | −29 | 0.09 | 5 | 3.3 | 60 | 151 | |
| 17 | | Chloroform | 263 | −94 | 0.42 | 3 | 7 | 67 | 70 | |

TABLE 2-continued

| Fluorine-contained polymer [Melting point] <tan δ> | Properties of blowing agent | | | Add-on of blowing agent (mol/kg) | Rate of blowing agent loss (%) | Properties of foam | | | Remarks |
|---|---|---|---|---|---|---|---|---|---|
| | Kind | Critical temp. (°C.) | Melting point of polymer − Critical temp. (°C.) | | | Expansion ratio | Recovery after compression (%) | Tensile strength (kg/cm²) | |
| 18 | Methylene chloride | 237 | −68 | 0.80 | 16 | 1.5 | 53 | 200 | Substantially uniform cells |

EXAMPLE 19

To 100 parts by weight of polyvinylidene fluoride (KYNAR 720, mfd. by Pennwalt Corp.) was added 0.625 parts by weight of triallyl cyanurate, and they were homogeneously mixed, thereafter fed to an extruder, and formed into a sheet of 1.1 mm thickness. Subsequently, the sheet was irradiated by electron beam of 10 Mrad in the same manner as in Example 1, and then impregnated with dichloromonofluoromethane in an autoclave at 75° C. for 92 hours to obtain an expandable sheet. The tan δ of this crosslinked sheet was 0.71. Next, the expandable sheet was heated in an oil bath at 190° C. for 25 seconds to obtain a foam sheet. Characteristics of the foam sheet obtained are tabulated in Table 3.

EXAMPLE 20

Tetrafluoroethylene-vinylidene fluoride copolymer (KYNAR 7201, mfd. by Pennwalt Corp.) was formed into a sheet of 1.1 mm in thickness by means of a hot press. The sheet was irradiated by electron beam of 30 Mrad to obtain a crosslinked sheet having a tan δ at 152° C. of 0.42, which was then impregnated with dichlorotetrafluoroethane in an autoclave at 75° C. for 92 hours to obtain an expandable sheet. Subsequently, the expandable sheet was heated on an oil bath at 155° C. for 25 seconds to obtain a foam sheet. Characteristics of the foam sheet obtained are tabulated in Table 3.

EXAMPLE 21

Hexafluoropropylene-vinylidene fluoride copolymer (KYNAR 2800, mfd. by Pennwalt Corp.) was formed into a sheet of 1.1 mm in thickness by means of a hot press, and the sheet was irradiated by electron beam of 30 Mrad to prepare a crosslinked sheet having a tan δ at 176° C. of 0.42. Subsequently, the crosslinked sheet was impregnated with dichlorotetrafluoroethane in an autoclave at 75° C. for 92 hours and then heated on an oil bath at 175° C. for 25 seconds to obtain a foam sheet. Characteristics of the foam sheet are tabulated in Table 3.

EXAMPLE 22

The expandable sheet obtained in Example 20 was expanded by heating by use of steam at a gauge pressure of 2.3 kg/cm² for 5 seconds. The foam thus obtained was composed of uniform cells having an average cell diameter of 0.1 mm. Characteristics of the foam are tabulated in Table 3.

EXAMPLE 23

A crosslinked sheet was prepared in the same manner as in Example 21, except for changing the irradiation dose to 20 Mrad, and impregnated with dichlorotetrafluoroethane to obtain an expandable sheet. Subsequently, the expandable sheet was heated by use of steam at a gauge pressure of 3.3 kg/cm² for 5 seconds to produce a foam having uniform cells. Characteristics of the foam are tabulated in Table 3.

TABLE 3

| | Fluorine-contained polymer | tan δ | Blowing agent | Expansion ratio (fold) | Recovery after compression (%) | Tensile strength (kg/cm²) | Remarks |
|---|---|---|---|---|---|---|---|
| 19 | Polyvinylidene fluoride (KYNAR 720) | 0.71 | Dichloromonofluoromethane | 13 | 73 | 25 | Uniform cells |
| 20 | Tetrafluoroethylene-vinylidene fluoride copolymer (KYNAR 7201) | 0.42 | Dichlorotetrafluoroethane | 5 | 91 | 40 | Uniform cells |
| 21 | Hexafluoropropylene-vinylidene fluoride copolymer (KYNAR 2800) | 0.42 | Dichlorotetrafluoroethane | 5 | 91 | 45 | Uniform cells |
| 22 | Tetrafluoroethylene-vinylidene fluoride copolymer | 0.42 | Dichlorodifluoromethane | 12 | 80 | 24 | Uniform cells |
| 23 | Hexafluoropropylene-vinylidene fluoride copolymer | 0.53 | Dichlorotetrafluoroethane | 15 | 87 | 20 | Uniform cells |

EXAMPLE 24

Experiment Examples 1 and 2

Tetrafluoroethylene-ethylene polymer (AFLON COP C-55A, mfd. by Asahi Glass Co., Ltd.) was formed into a sheet of 1.3 mm in thickness by means of a hot press. The sheet was irradiated by electron beam of 35 Mrad to obtain a crosslinked fluorine-contained polymer sheet, which was then impregnated with trichlorofluoroethane in an autoclave at 75° C. for 92 hours to obtain an expandable sheet in the same manner as in Example 1. Subsequently, the expandable sheets thus obtained were individually placed in a nitrate bath at 295° C. and heated for 15 seconds or 20 seconds (Experiment Examples 1 and 2, respectively). The characteristics of the foam sheets are tabulated in Table 4.

EXPERIMENT EXAMPLES 3 AND 4

Foam sheets were obtained in the same manner as in Experiment Example 2, except that the thickness of the raw sheet was changed to 1.1 mm or 1.0 mm, respectively. Characteristics of the foam sheets obtained are tabulated in Table 4.

EXPERIMENT EXAMPLES 5 AND 6

Foam sheets were obtained in the same manner as in Experiment Example 2, except that the thickness of raw sheet was changed to 1.05 mm and the irradiation dose to 40 Mrad or 60 Mrad. Characteristics of the foam sheets obtained are tabulated in Table 4.

of melting and the temperature at peak of melting measured by DTA were 112° C. and 146° C., respectively. The sheet of crosslinked fluorine-contained polymer obtained was placed in an autoclave, and dichlorodifluoromethane was pressed thereinto, after which the sheet was impregnated with dichlorodifluoromethane at 75° C. for 50 hours to obtain an expandable sheet containing dichlorodifluoromethane in an amount of 0.65 mol per 1 liter of the polymer. The expandable sheet was exposed in air to obtain a sheet having dichlorodifluoromethane infiltrated thereinto in an amount of 0.5 mol per 1 liter of the polymer, which was then heated by use of steam at a gauge pressure of 3.0 kg/cm$^2$ for 30 seconds to be expanded. The foam thus obtained had an expansion ratio of 13-fold, contained uniform cells having an average cell diameter of 20 μm, and had excellent characteristics, i.e., a recovery after compression of 87%, a surface thermal resistance of

TABLE 4

| | | Polymer | Expansion ratio (fold) | Average cell diameter (mm) | Closed cell percentage (%) | Hardness (JIS-A) | Sealing Properties | |
|---|---|---|---|---|---|---|---|---|
| | | | | | | | Leakage (cc/hr) | Maximum airtightness pressure (kg/cm$^2$) |
| Example 24 | 1 | Tetrafluoro- | 2.6 | 0.30 | 95 | 90 | 0.03 | >3 |
| | 2 | ethylene- | 3.5 | 0.25 | 95 | 75 | 0.0 | >3 |
| | 3 | ethylene | 6 | 0.20 | 80 | 60 | 0.15 | 3.0 |
| | 4 | copolymer | 6 | 0.20 | 96 | 61 | 0.13 | >3 |
| | 5 | (AFLON | 7 | 0.30 | 90 | 55 | 0.3 | 1.5 |
| | 6 | COPC-55A) | 10 | 0.30 | 91 | 30 | 0.5 | 1.3 |

EXAMPLE 25

In Table 5 are shown the evaluation results of sealing properties of the foams obtained in Example 19, 20 and 21.

In Table 5, the data in the rows 1, 2 and 3 are those of the foams obtained in Examples 19, 20 and 21, respectively.

0.18 m$^2$·h·°C./Kcal, a dielectric strength of 23 KV/mm and a strength ratio of 100% (Example 26).

A foam was obtained in the same manner as described above, except that the heating conditions in expanding treatment were changed to heating by use of steam at a gauge pressure of 2.5 kg/cm$^2$ for 20 seconds (Example 27).

Characteristics of the foam obtained are tabulated in

TABLE 5

| | | Polymer | Expansion ratio (fold) | Average cell diameter (mm) | Closed cell percentage (%) | Hardness (JIS-A) | Sealing Properties | |
|---|---|---|---|---|---|---|---|---|
| | | | | | | | Leakage (cc/hr) | Maximum airtightness pressure (kg/cm$^2$) |
| Example 25 | 1 | Polyvinylidene fluoride (KYNAR 720) | 13 | 0.2 | 96 | 65 | 0.03 | >3.0 |
| | 2 | Tetrafluoro-ethylene-vinylidene fluoride copolymer (KYNAR 7201) | 5 | 0.2 | 96 | 61 | 0.10 | >3.0 |
| | 3 | Tetrafluoro-propylene-vinylidene fluoride copolymer (KYNAR 2800) | 5 | 0.2 | 96 | 62 | 0.16 | 3.0 |

EXAMPLES 26 AND 27

Vinylidene fluoride-hexafluoropropylene copolymer (Kynar #2800, mfd. by Pennwalt Corp.) was formed into a sheet of 1.2 mm in thickness by means of a hot press, and crosslinked by means of an electron beam irradiation apparatus. The tan δ at 176° C. of the crosslinked sheet was 0.4. The temperature at the beginning Table 6.

EXAMPLES 28 TO 34

Foams were obtained in the same manner as in Example 27, except that the fluorine-contained polymer and the blowing agent shown in Table 6 were used and that heating conditions were properly selected. As shown in Table 6, the foams obtained had excellent performance characteristics.

merizing them at the molar ratio of 70/5/25; melting point 137° C.) was formed into a sheet so as to have a

TABLE 6

| | Fluorine-contained polymer | | | | | Blowing agent | | |
|---|---|---|---|---|---|---|---|---|
| Example | Name | Melt flow rate (g/10 min) | Temp. at the beginning of melting (°C.) | Temp. at peak of melting (°C.) | tan δ (G''/G') | Name | Critical tep. (°C.) | Add-on (mol/liter polymer) |
| 26 | Vinylidene fluoride-hexafluoropropylene copolymer (Kynar #2800) | 0.28 | 112 | 146 | 0.4 | Dichlorodifluoromethane | 112 | 0.5 |
| 27 | Vinylidene fluoride-hexafluoropropylene copolymer (Kynar #2800) | " | " | " | " | " | " | " |
| 28 | Vinylidene fluoride-hexafluoropropylene copolymer (95/5 mol %) | 1.5 | 112 | 146 | 0.42 | " | " | 0.64 |
| 29 | Vinylidene fluoride-hexafluoropropylene copolymer (95/5 mol %) | " | " | " | " | " | " | 0.5 |
| 30 | Vinylidene fluoride-hexafluoropropylene copolymer (95/5 mol %) | " | " | " | " | Octafluorocyclobutane | 115 | 0.18 |
| 31 | Vinylidene fluoride-hexafluoropropylene copolymer (92/8 mol %) | 2.0 | 78 | 112 | 0.42 | Chlorodifluoromethane/chloropentafluoroethane (48.8/51.2 wt %) | 82 | 2.1 |
| 32 | Vinylidene fluoride-tetrafluoroethylene copolymer (Kynar #7200) | 2.3 | 85 | 122 | 0.42 | Chlorodifluoromethane | 96 | 3.0 |
| 33 | Vinylidene fluoride-tetrafluoroethylene copolymer (64/36 mol %) | 3 | 116 | 150 | 0.42 | Dichlorodifluoromethane | 112 | 0.64 |
| 34 | Polyvinylidene fluoride | 1.1 | 115 | 168 | 0.52 | Octafluorocyclobutane | 115 | 0.2 |

| | Foam | | | | | | | |
|---|---|---|---|---|---|---|---|---|
| Example | Expansion ratio (fold) | Average cell diameter (μm) | Recovery after compression (%) | Surface thermal resistance ($m^2 \cdot h \cdot °C./kcal$) | Dielectric strength ratio (%) | Surface smoothness | Tensile strength ($kg/cm^2$) | Cell distribution |
| 26 | 13 | 20 | 87 | 0.18 | 100 | | 25 | Uniform |
| 27 | 5 | 12 | 91 | 0.19 | 100 | | 41 | Uniform |
| 28 | 15 | 12 | 87 | 0.19 | 100 | | 20 | Uniform |
| 29 | 1.5 | 1 | 62 | 0.12 | 70 | | 240 | Uniform |
| 30 | 2 | 90 | 62 | 0.12 | 70 | Δ | 230 | Uniform |
| 31 | 20 | 90 | 73 | 0.14 | 70 | Δ | 12 | Uniform |
| 32 | 20 | 50 | 75 | 0.19 | 80 | | 11 | Uniform |
| 33 | 2.5 | 5 | 65 | 0.16 | 100 | | 152 | Uniform |
| 34 | 2.5 | 50 | 60 | 0.14 | 80 | | 150 | Uniform |

EXAMPLE 35

Ethylene-tetrafluoroethylene copolymer [ALFON COPC 88APM, mfd. by Asahi Glass Co., Ltd., melt flow rate (297° C., 2.16 kg) 22 g/10 min., melting point 271° C.] was extruded into a sheet of 1 mm in thickness by means of a casting roll. This sheet was placed in an autoclave and trichlorotrifluoroethane was pressed thereinto, after which the resulting mixture was heated under pressure at 100° C. for 3 days, cooled, thereafter taken out, and then irradiated by electron beam of 40 Mrad to be crosslinked. Subsequently, the expandable composition thus obtained was pressed through a hot-air oven at 290° C. to obtain an expanded sheet. The expanded sheet had an expansion ratio of about 8-fold, and contained uniform cells having an average cell diameter of 0.3 mm.

This foam was pressed with heating in vacuo at 310° C. into a polymer sheet of 1.2 mm in thickness. The tan δ at 301° C. of this polymer sheet was measured to be 0.52.

EXAMPLE 36

Vinylidene fluoride-hexafluoropropylene-tetrafluoroethylene copolymer (a polymer obtained by polymerizing them at the molar ratio of 70/5/25; melting point 137° C.) was formed into a sheet so as to have a thickness of 1.2 mm. The sheet thus obtained was irradiated by electron beam of 25 Mrad to be crosslinked. The tan δ at 169° C. of the crosslinked sheet was 0.52.

The crosslinked sheet was impregnated with dichlorodifluoromethane in the same manner as in Example 1 to obtain an expandable composition containing dichlorodifluoromethane in an amount of about 3.8 parts by weight (0.31 mol/kg) per 100 parts by weight of the polymer.

The expandable composition was heated by use of steam at a gauge pressure of 3.0 kg/cm² for 20 seconds to obtain a foam excellent in flexibility which had an expansion ratio of 8.0-fold, contained no void, and had uniform cells.

INDUSTRIAL APPLICABILITY

The foam of crystalline fluorine-containing polymer of this invention is good in cushioning properties and elasticity and excellent in chemical resistance, solvent resistance, creep resistance, wear resistance, mechanical strengths such as tensile strength and tear propagation strength, thermal insulating properties, weatherability, non-adhesive properties, radiofrequency insulating properties such as wire insulation and cable jacketing, etc. Moreover, since there is used therein as base polymer a crosslinked, crystalline, fluorine-containing polymer having a ratio of dynamic loss modulus to dynamic storage modulus at a temperature 30° C. higher than the melting point of the polymer of 0.3 to 0.9, preferably 0.35 to 0.8, the foam of this invention is of high quality, for example, it is free from break of cell walls and pinholes which tend to occur at the early stage of expansion and from deformed cells, all wall ruptures and voids which are due to deformation of abnormal flow at the expansion stage of cell walls, and its cells are uniform in size.

Therefore, when the above-mentioned characteristics are utilized, the foam of this invention is useful as a sealing material in transport containers for chemicals and solvents; a gasket for piping and machinery and tools; a thermal insulating material, sealing material, waterproof material and roof thermal insulating waterproof material for buildings; a thermal insulating material for machinery and tools; a thermal insulating material for fireman's dress; a cushioning material for printing plates; a materials for transfer roll for printing machines and copy machines; an insulating material for high-speed data communications such as computers and communication circuits; abrasive cloth for precision polishing required to have uniform dispersion of fine abrasive particles; a cushioning material required to have high chemical resistance; etc.

What is claimed is:

1. An expandable fluorine-contained polymer composition comprising
   (A) a crystalline crosslinked fluorine-containing polymer in which the ratio (tan δ) of dynamic loss modulus to dynamic storage modulus at a temperature 30° C. higher than the melting point of the polymer of from 0.3 to 0.9, and
   (B) a blowing agent.

2. A composition according to claim 1, wherein said tan δ of from 0.35 to 0.8.

3. A composition according to claim 1, wherein said crystalline fluorine-containing polymer has as its main component at least one monomer selected from the group consisting of fluoroethylene, fluoro-α-olefins, fluoroalkyl fluorovinyl ethers and fluoroalkyl vinyl ethers.

4. A composition according to claim 1, wherein said crystalline fluorine-containing polymer is selected from the group consisting of ethylene-tetrafluoroethylene copolymers, polyvinylidene fluorides, vinylidene fluoride-hexafluoropropylene copolymers, vinylidene fluoride-tetrafluoroethylene copolymers and vinylidene fluoride-hexafluoropropylene-tetrafluoroethylene copolymers.

5. A composition according to claim 1, wherein said blowing agent has a solubility in said polymer of 0.02 mol or more per kg of said polymer, and a rate of blowing agent loss from said polymer (25° C.) of less than 20% of add-on per 0.1 day in a sheet of 1.2 mm in thickness.

6. A composition according to claim 5, wherein said solubility is 0.04 mol or more per kg of said polymer and said rate of blowing agent loss is 10% or less of add-on per 0.1 day in a sheet of 1.2 mm in thickness.

7. A foam of fluorine-contained polymer obtained by expanding, at an expansion ratio of at least 1.5-fold, a crosslinking crystalline fluorine-containing polymer having a crosslinked structure in which the ratio (tan δ) of dynamic loss modulus to dynamic storage modulus at a temperature 30° C. higher than the melting point of from 0.3 to 0.9.

8. A foam according to claim 7, wherein said crystalline fluorine-containing polymer is one which is obtained by using as its main component at least one monomer selected from the group consisting of fluoroethylene, fluoro-α-olefins, fluoroalkyl fluorovinyl ethers, and fluoroalkyl vinyl ethers.

9. A foam according to claim 7, wherein said tan δ ranges from 0.35 to 0.8.

10. A foam according to claim 7, wherein said crystalline fluorine-containing polymer is selected from the group consisting of ethylene-tetrafluoroethylene copolymers, polyvinylidene fluorides, vinylidene fluoride-hexafluoropropylene copolymers, vinylidene fluoride-tetrafluoroethylene copolymers and vinylidene fluoride-hexafluoropropylene-tetrafluoroethylene copolymers.

11. A foam according to claim 7, which has an average cell diameter of 90 μm or less.

* * * * *